(12) United States Patent
Wilson et al.

(10) Patent No.: US 8,996,630 B2
(45) Date of Patent: Mar. 31, 2015

(54) EVENT NOTIFICATION SYSTEM FOR ASSOCIATING AN OUTGOING ELECTRONIC MESSAGE WITH AN INCOMING RESPONSE

(75) Inventors: Jason Wilson, Toronto (CA); Raul Sinimae, Toronto (CA)

(73) Assignee: Globestar, Inc., Toronto (CA)

( * ) Notice: Subject to any disclaimer, the term of this patent is extended or adjusted under 35 U.S.C. 154(b) by 732 days.

(21) Appl. No.: 13/347,380

(22) Filed: Jan. 10, 2012

(65) Prior Publication Data
US 2013/0179503 A1 Jul. 11, 2013

(51) Int. Cl.
*G06F 15/16* (2006.01)
*H04L 12/58* (2006.01)

(52) U.S. Cl.
CPC ................ *H04L 51/16* (2013.01); *H04L 51/30* (2013.01); *H04L 51/18* (2013.01)
USPC ........................................................ 709/206

(58) Field of Classification Search
CPC ...................................................... H04L 51/30
USPC .................................................... 709/206–207
See application file for complete search history.

(56) References Cited

U.S. PATENT DOCUMENTS

| | | | |
|---|---|---|---|
| 7,783,713 B2 * | 8/2010 | Easwar et al. | 709/206 |
| 2002/0002633 A1 * | 1/2002 | Colling, III | 709/318 |
| 2009/0013047 A1 * | 1/2009 | Adreon et al. | 709/206 |

* cited by examiner

*Primary Examiner* — Jason Recek
(74) *Attorney, Agent, or Firm* — Robert Schuler

(57) ABSTRACT

An event notification system is linked to a plurality of event generation devices and to an event notification network. The system receives event messages from the event generation devices and determines what information should be included in an event notification message that the system transmits to one or more recipient devices. Each event notification message includes coded event message information and a coded unique message identity. A response message receive by the system from a recipient device includes the coded event message information which is used by the system to validate the response.

22 Claims, 7 Drawing Sheets

EVENT NOTIFICATION NETWORK 10

EVENT NOTIFICATION SYSTEM (ENS) 11

EVENT NOTIFICATION SYSTEM FOR ASSOCIATING AN OUTGOING ELECTRONIC MESSAGE WITH AN INCOMING RESPONSE

BACKGROUND

1. Field of the Invention

The present disclosure relates generally to systems capable of generating, transmitting and receiving electronic messages, and specifically to an event notification system that is able to correlate outgoing messages with associated response messages.

2. Background

In certain settings, it is beneficial to be able to submit requests for assistance that can be automatically distributed to the correct recipient or recipients, and then determine whether the recipient has received and responded to the request. Communication systems are in use that receive messages from one or more event generation devices (EGD), process the event messages to determine which of one or more recipients should receive information included in the event message, transmit an event notification message to the correct recipient(s), receive a response to the notification message from the recipient, determine whether the response is valid or not, and then determine what to do with the response. These systems are typically referred to as Event Notification Systems (ENS) and they can be useful in healthcare settings, emergency management settings, retail or commercial settings, and in many other settings. FIG. 1 is a diagram of a communication network 10 that includes an Event Notification System 11 (ENS), a device 12 that generates event messages and a device 13 for receiving event notification messages. The event generation device 12 can be linked to the ENS 11 via a wired or wireless connection and can be in communication with the ENS over a proprietary or a standard communication protocol. The ENS 11 can be linked to the receiving device 13 over a wireless or wired connection operating according to either a standard or proprietary communications protocol.

Event Notification Systems are designed and can be configured to process a large number of event messages for distribution to a large number of recipients. In order for an ENS to process a response to an outgoing event message, and based upon the response to initiate a meaningful action, it is necessary that certain information included in the outgoing event message be correlated with certain information included in an incoming response. So, for instance, if ten event messages are generated in a health care setting at a particular point in time for distribution to ten or more recipients, and some or all of the event messages are generated for different reasons (i.e., nurse needs assistance in a particular room, or a particular operating room needs medicine or supplies, or a particular elevator has stopped working with passengers inside), the ENS should be designed such that it is able to determine which of the responses correspond with which ones of the event notification messages, otherwise any action that the ENS takes as the result of the response could be meaningless.

DESCRIPTION OF RELATED ART

In order to unambiguously correlate outgoing event notification messages with incoming responses, Event Notification Systems can assign a unique message identifier to outgoing message and store this identifier as well as other information corresponding to the message state. Then, when the EMS receives a response, it can compare the unique message identifier included in the response message with the stored message identifiers to determine to which outgoing message the incoming response correlates to. FIG. 2 is a diagram showing the ENS 11 of FIG. 1 in more detail. In operation, the ENS 11 can receive event messages from the event generation device 12, and an event message processing/distribution function 14 can determine from which device it received the event message, determine which of one or more destination device(s) should receive the message, it can assign a unique message identity, and it can store certain state information associated with the message. This message state can include the message context, the message destination, the unique message identity, an event identity, etc. The output functionality of an output/input message processor 15 can then send an outgoing message (including the unique message identifier) to a receiving device, which can then respond to the message in some appropriate manner. Upon receiving a response from the receiving device, the input functionality of the message processor 15 running on the ENS 31 can parse the response to determine from which device the response was sent, to identify certain response information and to determine the unique identity of the received message. This unique identity included in the response message can then be compared to the stored identities in order to correlate an outgoing message with the response message. In order for the ENS to provide useful information, it has to store the unique message identity as well as other message state information, such as context information transmitted with the outgoing message, an event identity, etc.

U.S. Patent Application Publication No. 2010/0088301A1 (Block) describes a text messaging system that can correlate user responses to system requests. Specifically, page 2 starting in paragraph [0025] of Block describes a token based approach that allows a user to send an unambiguous response wherein the system relies on maintaining state based on tracking messages and responses using a request identifier.

U.S. Patent Application Publication No. 2004/0022264A1 (McCue) describes a notification system that inserts an ID tag into the body of a outgoing text message and stores the tag and associated context of the message in a database prior to transmitting the message. When the system receives a reply to the message, it detects a tag in the reply and compares this to the tags stored in the database in order to correlate the outgoing message to the reply.

U.S. Patent Application Publication No. 2007/0118647A1 (Lee et al.) describes (starting on page 2 in paragraph [0018]) a notification system that generates and inserts a unique message ID into the header of an outgoing message, and stores the unique message ID in a database. Message distribution logic then is able to correlate a received message with an outgoing message using the stored unique message ID.

All of the notification systems described in the above referenced publications generate a unique outgoing message ID, insert the unique ID into the outgoing message and store the state (unique ID, event ID, context, etc.) of the outgoing message for later correlation to information included in a response message. In this manner, responses to outgoing notification messages can be validated. According to standards based text messaging formats, it is not a requirement that a unique message identity be included in an outgoing message. For this and other reasons, transport protocols are not necessarily designed to preserve the unique message identity as it travels through a communications network. So, depending upon which field in the outgoing message the unique ID is inserted into, the ID may or may not be included in a response message. Further, storing the state of all outgoing messages for the purpose of correlating an outgoing event notification message with an incoming response message can place an unnecessary burden on the ENS.

BRIEF DESCRIPTION OF THE DRAWINGS

The present invention can be best understood by reading the specification with reference to the following Figures, in which.

DETAILED DESCRIPTION

In lieu of the limitations associated with the prior art event notification systems, it was discovered that by placing a coded instance of some or all of the event message state information and a unique message identifier, collectively referred to here as coded event message information (CEMI), in the body of an outgoing message sent to a receiving device eliminates the need to store this information locally in the event notification system, and ensures that all of the original message state is returned in a response to an outgoing message from the receiving device. The outgoing message information returned to the ENS in a response message is then used to validate information included in a response message. Once the response message is validated and in order to determine the next action to take, the ENS can use the unique identity in the response to correlate the response to the original event notification message.

Figure 1:
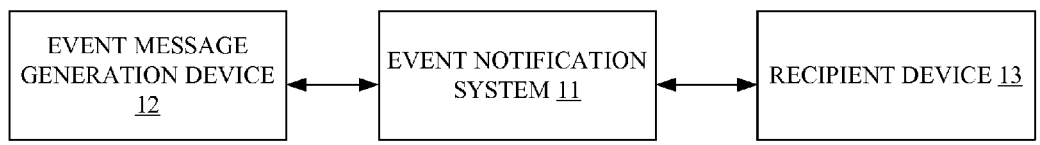
FIG. 1 is high level diagram of an event notification network 10.
Figure 2:
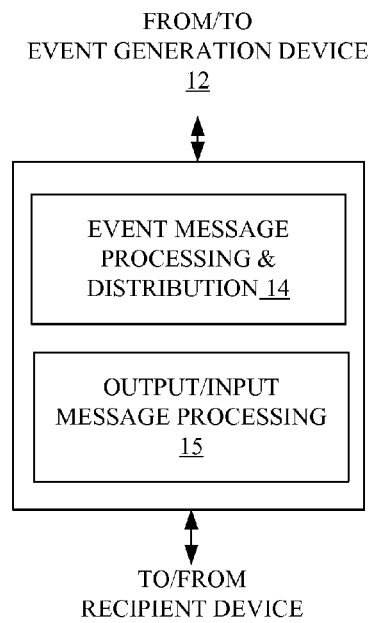
FIG. 2 is a diagram of an event notification system 11 and associated communication devices.
Figure 3:
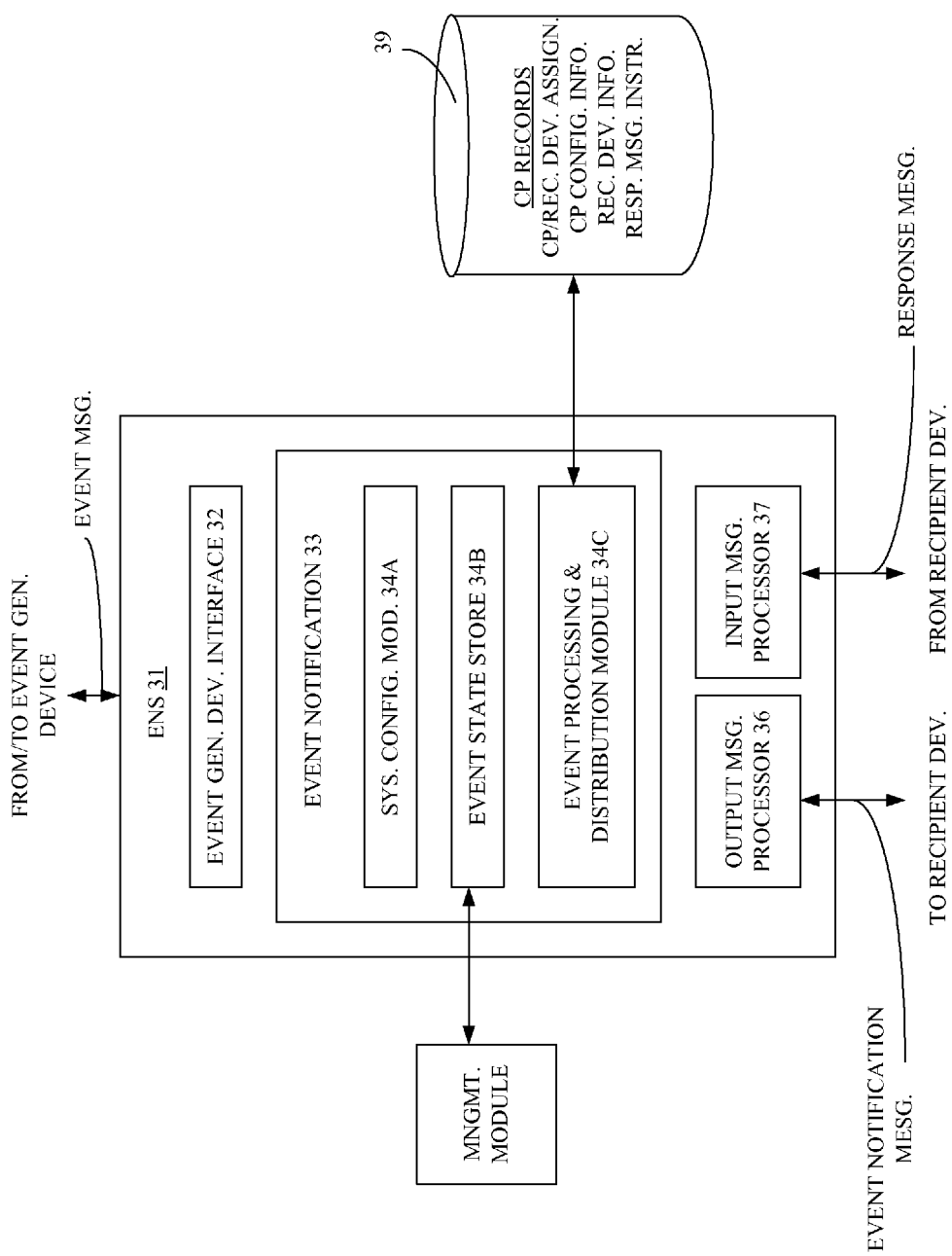
FIG. 3 is a functional block diagram of one embodiment of an event notification system 31.

FIG. 3 is a block diagram illustrating functional elements comprising an Event Notification System (ENS) 31. System 31 is linked to one or more call points (CPs) and to one or more recipient devices (RDs. The ENS 31 can be implemented in any computer server or dedicated computational device or appliance capable of receiving and transmitting information over a local or wide area network to client devices, such as call points and recipient devices. The call points can be any device that generates an event message as described earlier in the background section. The call points can be wired or wireless devices which are connected to the ENS 31 over standard or proprietary communication links, and the recipient devices can be any of a variety of wired or wireless devices such as a mobile phone, a pager, a computational device, a wired phone system or any other device that is suitable for receiving an event notification message and they can be connected to the ENS 31 over any suitable communication link. In a preferred embodiment of the invention, a recipient device is running an email client and the transport mechanism between the ENS 31 and the recipient device can be the Post Office Protocol (POP), the Simple Mail Transfer Protocol (SMTP), Internet Messaging Access Protocol (IMAP) or any other appropriate protocol. The ENS 31 is comprised of a event generating device (call point) interface 32, an event notification module 33, an event notification output message processing module 36 and an input or response message processing module 37. Although the event generating device is typically implemented as a call point, it does not have to be, but can be any fixed or mobile device capable of generating an event message. The event notification module 33 can include an event notification system configuration module 34A that generally operates to receive system configuration information from an input device via a graphical user interface and keyboard (for instance) not shown. The event notification module 33 can also include means 34B for storing information associated with active events, which means can include such things as whether or not a response to an outgoing event message is received, the time that an event message is generated and the time a response is received, for instance. The means 34B can be any computer readable medium suitable for storing the event message state information. The event notification module 33 can also include an event processing and distribution module 34C. Module 34C can operate on an event message received from a CP to compile/gather information used by the output message processing module 36 to format an event notification message. Module 34C can also operate on response message information received from the input message processing module 37 to determine what further action the ENS 31 can take relative to the original event notification message. More specifically, module 34C operates to determine what event message specific information (state information), corresponding to an event message received from a particular CP, is sent to the module 36 for inclusion in an event notification message. It also operates to generate and assign a unique message identity to each event message, and to send this unique output message identifier information to the output message processing module 36. The event message state information generated by the module 34C can include, but is not limited to, an event identity, a recipient identity, message context, valid user responses, time stamp, etc. The unique message identifier includes information that refers to a particular version of a particular message. This unique message identifier can be generated by the event notification module 33 in any one or a number of ways which are well known to those skilled in the art, and so will not be described here. Module 34C also operates on information it receives from the input message processing module 37 to determine whether to escalate, cancel or to initiate some other action based upon information included in a response message.

The database module 39 in FIG. 3 can operate in conjunction with a DBMS (not shown) to store information used by the ENS 31 to generate event notification messages and to store information used to determine what action to take according to received responses. Although the ENS 31 is described as including a database module managed by a DBMS, neither are necessary to the operation of the ENS 31. In one embodiment, the event processing and distribution module 34C can include computer readable memory means such as dynamic, programmable memory or static, programmable memory. Specifically, module 39 can store call point information in a record or a file that is comprised of call point to receiving device assignment information, call point configuration information, recipient device configuration information and a response message processing file. The CP to device assignment information is typically configured manually by a system administrator and can include information that determines which event messages are distributed to which recipient devices. The CP configuration information can include, among other things, a CP name, unique CP/event identity, event priority, state logic settings, activity logic settings, resets, status change communication settings, and contextual message information associated with the event that can be included in an outgoing event notification message. This contextual message information can include an explanation of the message type, response instructions to a recipient and a listing of response options from which the recipient can select. The recipient device configuration information can include such things as the network address of the recipient device, the name of the user responsible for the recipient device and the response message processing file can include instructions used by the distribution module 34C in taking actions based upon information included in a response message.

With continued reference to FIG. 3, the output message processing module 36 generally operates to generate outgoing event notification messages sent to one or more different recipient devices, such as a pager, a wireless phone, a laptop or any other wired or wireless communications device that is configured to receive event notification messages from the ENS 31. Specifically, the processor 36 places information (From, Sender, reply-to, to, cc, subject) into one or more fields comprising a header of an event notification message according to any suitable standard or proprietary electronic messaging format, such as the messaging format described in the IETF RFC publication 5322 dated October, 2008 for instance. The module 36 places a unique message identifier (UMI) generated by the module 33 into the body of the electronic message, and optionally can place event message state information (EMSI) generated by the event notification module 33 into the body of the message. The EMSI and UMI are each referred to here as coded event message (CEMI) information. According to an embodiment, this coded event message information (either or both of the EMSI and UMI) is placed into the body of an electronic message between two uncoded (human readable) warning messages that instruct the user (recipient in this case) to not modify the coded information included between the two warning messages. The coded event message information can be included before or after any data included in the body of the message. The coded event message information can include, but is not limited to an itemized list of the valid response options (ACK, Cancel, ESC) and a unique event message identity assigned to the event message by the event processing and distribution function 34C. The output message processing function 36 is described in more detail with reference to FIG. 5A. In one embodiment, the CEMI is contiguous, and in another embodiment the CEMI is not contiguous.

The input message processing module 37 generally operates to parse input/response messages received from any of the plurality of recipient devices in order to identify certain information included in the response message and to use this information to validate the information included in the response. More specifically, the module 37 detects the coded event message information in the response message, such as the valid response options, and compares this information to information included in the body of the response message. If at least some of the event message state information and the unique event message ID included in the coded portion of the response message matches some of the information (state information) included in the response message, then the module 37 determines that the response is valid and passes the valid response information, unique event message identity and possibly other information to the event processing module 34C. The operation of the input message processing function 37 is described in more detail later with reference to FIG. 5B. According to one embodiment of this invention, each recipient device is running a standard email client that is configured to always include the text of the original event notification message in a reply. Regardless of the messaging client running on each recipient device, the client is configured to always include a copy of the original incoming message text in an outgoing response message.

Figure 4:
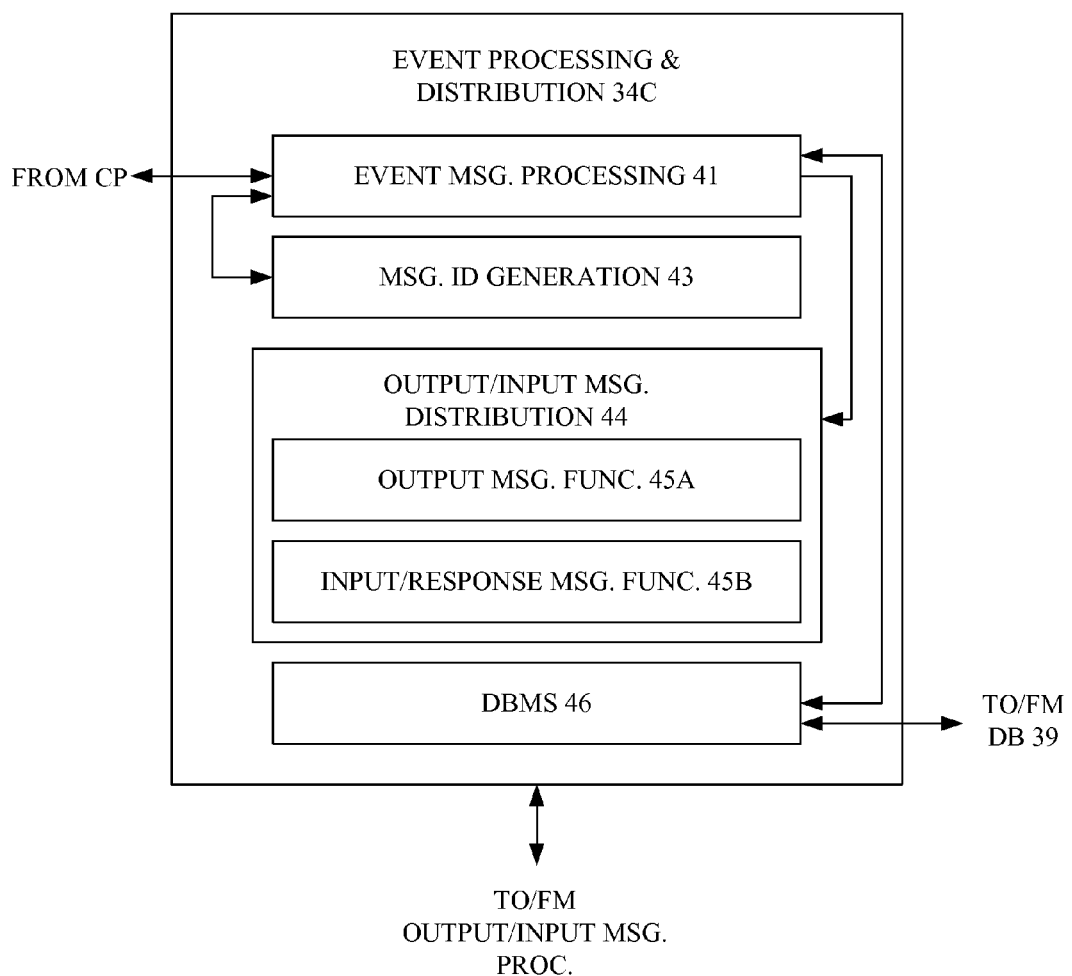
FIG. 4 is a block diagram of one embodiment of an event processing function.

FIG. 4 is a block diagram illustrating functionality that can comprise the event processing and distribution module 34C described earlier with reference to FIG. 3. Generally, the module 34C operates to receive event messages from one or more call points and to determine what event message specific information (state information) can be included in an outgoing event notification message. This state information can include but is not limited to an event identity, a recipient identity, valid user responses, event message time stamp information. Module 34C also operates to determine to which recipient devices the state information should be transmitted to. The event processing and distribution module 34C is comprised of an event message processing function 41, an event message identification function 43, a output/response message distribution function 44 and a database management system function 46. The output/response message distribution function 44 can include an output message function 45A and a response message function 45B.

The event message processing function 41 of FIG. 4 operates to detect a unique CP identifier received in an event message, and to use information in the CP configuration file (Event ID) stored in the database module 39 in FIG. 3, to determine from which CP an event message is received. Once the identity of the CP is known, the function 41 can access information stored in the CP configuration file, the CP/Device assignment file and the recipient device configuration file to determine what event message state can be included in an outgoing event notification message. For each event message received by the module 34C, the message identity function 43 generates a unique message ID that is then associated with the event message. As described earlier, a unique message identity can be generated in a number of different ways that are well know, and so methods for generating such a message ID will not be described here.

The outgoing/input message distribution module 44 shown in FIG. 4 can operate to distinguish between output message state information and information included in a response message received from a recipient device. The output message function 45A operates on output state information received from the event message processing function 41 to determine the distribution of event notification messages to recipient devices. Specifically, the logic 45A examines the CP/Device assignment files stored in the database module 39 to determine that a particular event notification message should be distributed to one or more recipient devices. Conversely, the response message function 45B uses instructions stored in the response message instruction file stored in the database 39 to operate on information parsed from a response message by the input message processing function 37 to determine what action the ENS 31 should take. Such action can include, the cancellation of an event, sending a notification that an event has been acknowledged, or escalating an event.

Figure 5A:
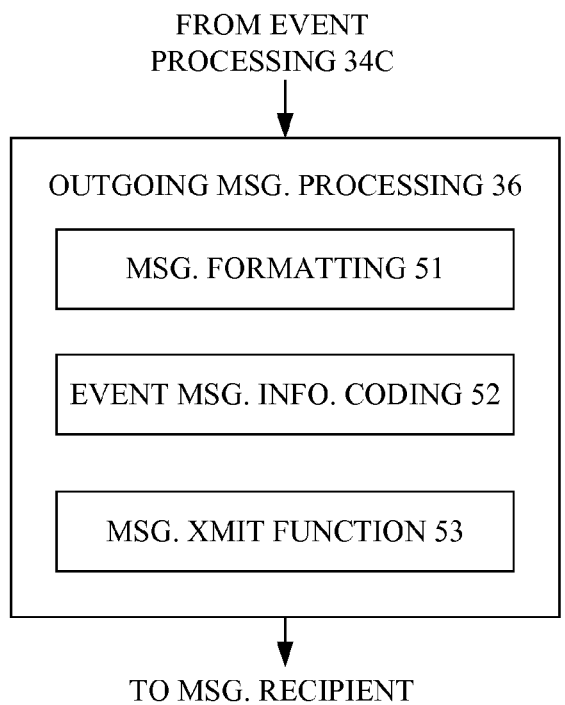
FIG. 5A is a functional block diagram of an output message processing function.

A detailed diagram of the functional elements comprising the outgoing message processing module 36 of FIG. 3 is shown with reference to FIG. 5A. A message formatting function 51 receives uncoded event information and other message routing and subject information (From, Sender name, reply-to, to, subject) from the event processing module 34C and places at least some of this information into the header and body of a message according to a particular electronic messaging format. The event message information coding function 52 receives some or all of the event message information associated with a particular event message from the event processing module 34C and encodes this information into an appropriate coded format. Generally, the key requirements of the encoding are that it be encoded such that the contents cannot be visually recognized (and therefore manipulated or modified) by the recipient user, it can include some form of checksum or CRC that will allow the EMS to recognize if it is modified or damages when it is returned as part of the user's response, and it can be encoded in a form that will not be inadvertently damaged in transit to/from the recipient system because of a transport protocol or system limitation (IN THE CASE OF EMAIL, THIS MEANS THAT IT SHOULD BE RENDERED USING THE STANDARD PRINTABLE ASCII CHARACTER SET). In one embodiment, base 64 encoding is used, however any number of well understood encoding schemes can be employed, provided they adhere to the requirements described above. This coded event message information (CEMI) is then passed to the message formatting function 51 which places this information into the body of the message as a coded event message information block CEMI). The CEMI block can be included in any location relative to human readable text information comprising the body of an electronic message, and all of the coded information comprising the block of coded event message information is typically contiguous, however, in one embodiment the CEMI can be non-contiguous. An embodiment of the coded event message information block is described in more detail with reference to FIG. 6. Once an electronic message is formatted, the formatted message is passed from the formatting function 51 to the message transmission function 53 for transmission over a medium to one or more recipient devices.

Figure 5B:
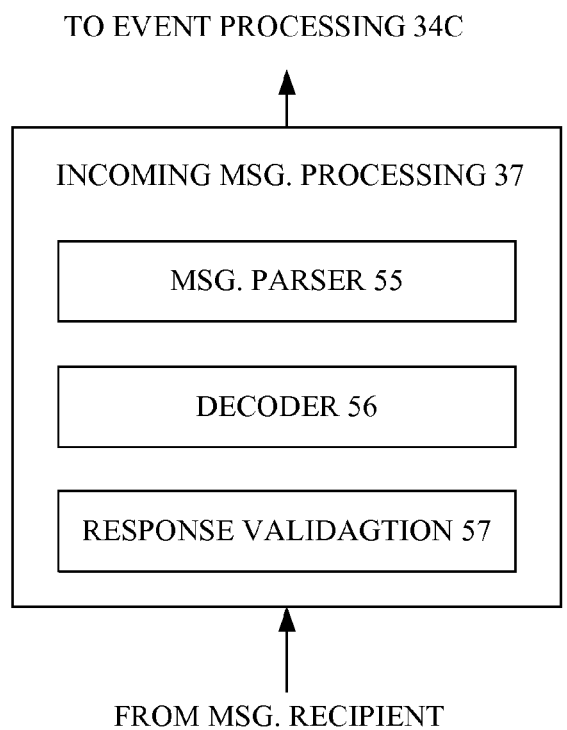
FIG. 5B is a functional block diagram of an input message processing function.

A detailed diagram of the functional elements comprising the input message processing module 37 of FIG. 3 are shown with reference to FIG. 5B. The module 37 is comprised of a parser 55, a decoding function 56 and a response validation function 57. The parser 55 operates to detect information included in any of the header fields and the body comprising a response message. So for instance, the parser can detect information included in a response message received from a recipient device that can be used by the input message processing function 37 to validate the response. Such information can include, among other things, an acknowledgement type response from a user that a particular event notification message is received at their recipient device, it can include a response that escalates the event in some manner or it can be a response that cancels the original event message. The parser can also operate to detect and pass the coded event message information returned in the response message to the decoder 56. The decoder operates to decode the coded event message information, which can include event message state information and a unique message identifier. The response validation function 57 operates to compare uncoded information included in a response message (ACK, Cancel, Escl.) with coded event message information that is placed in the original output event notification message. If the uncoded response information correlates with the coded event message information (i.e., a response if determined to be valid), then the response information (ACK, Cancel, Escl.) can be sent to event processing module 34C along with the unique message identifier.

Figure 6:
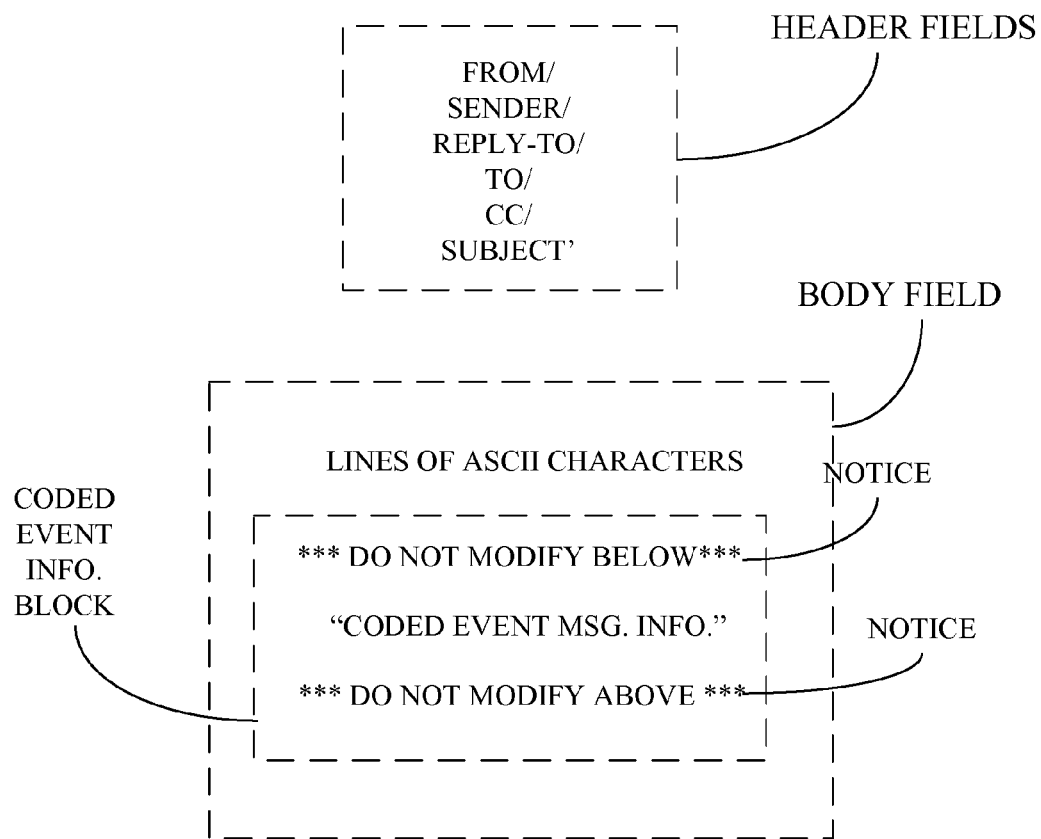
FIG. 6 is a diagram of an embodiment of an event notification message format.

FIG. 6 is a diagram of an embodiment of an electronic message format 60 comprising the coded event message information block 61 described earlier with reference to FIG. 5A. The body of the message includes one or more lines of ASCII characters and the coded event message information block. Among other things, the information block 61 includes encoded event message state information and a message identity that uniquely identifies an event notification message. The information block 61 is encapsulated by two lines of ASCII characters that notify the user to not modify any of the information included in the block 61.

Figure 7A:
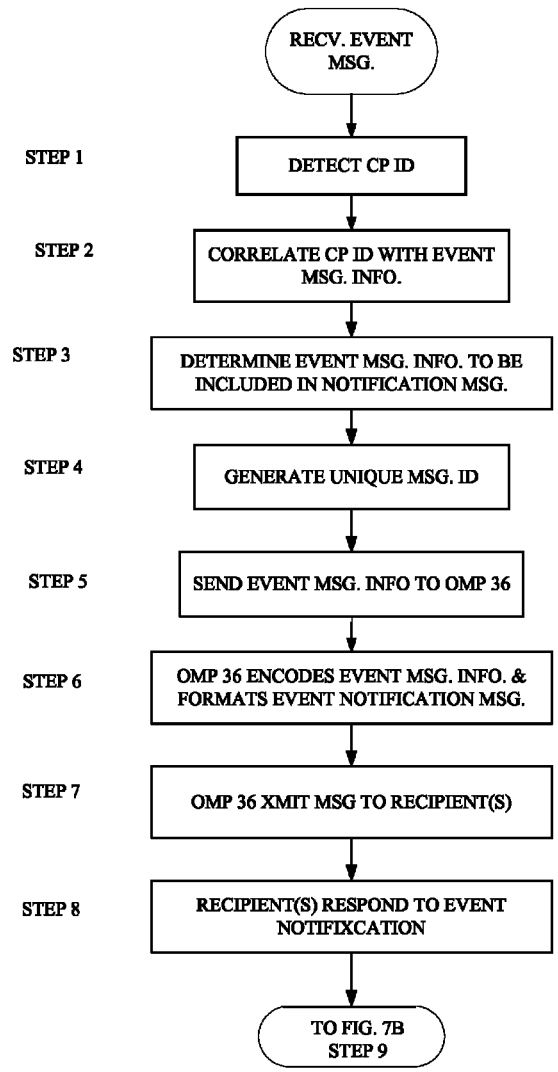
FIG. 7 is a logical flow diagram describing the operation of one embodiment of an event notification system.
Figure 7B:
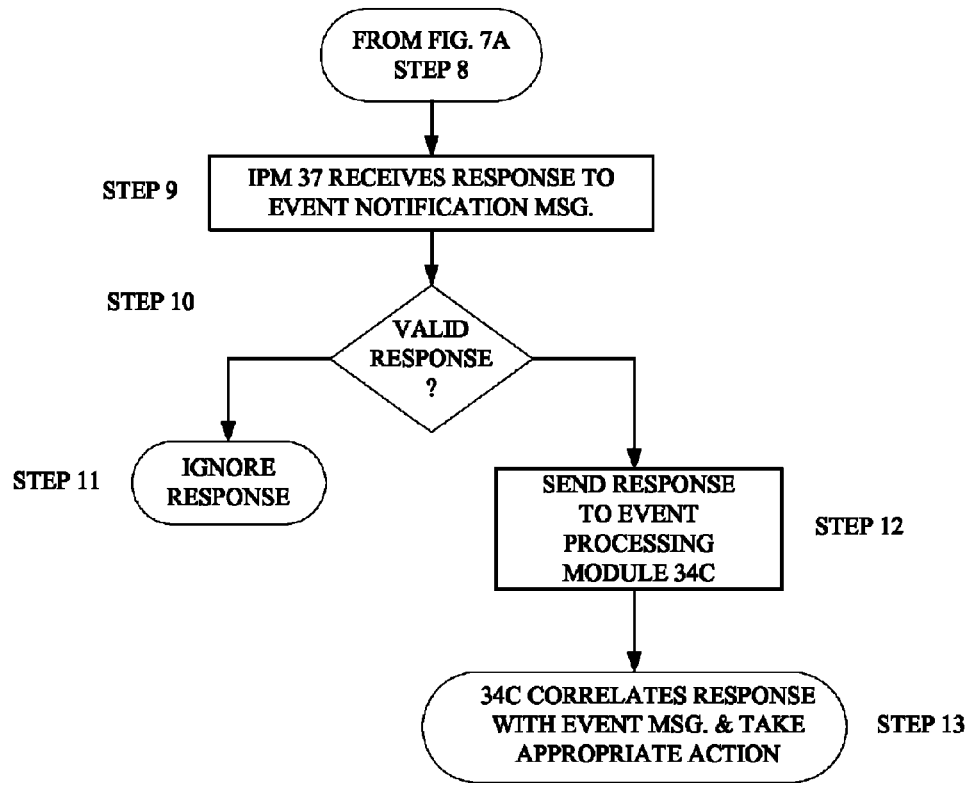

FIG. 7 is a logical flow diagram showing the steps that the Event Notification System 31 can follow to generate an event notification message and to process a response to the event notification message. It should be understood, that the electronic message generated and transmitted by the output message processing function 36 is not limited to messages formatted according to RFC 5322 or related formats, but can include any messaging format suitable for conveying one or more lines of ASCII text and coded information. Subsequent to the ENS 31 described with reference to FIG. 3 receiving an event message, in Step 1 the Event Processing and Distribution module 34C detects CP identification information included in the message, and in Step 2 the CP ID detected in Step 1 is used to access a related CP record stored in the data base storage device 39. The CP record includes a store of event message information that is associated with an event generated by a respective CP. In Step 3 the ENS 31 uses information included in the event record to determine what event message information can be include in a notification message. For example, instructions included in an event message can be different depending upon the recipient device the message is sent to. In Step 4 the module 34C generates a unique message identity, and in Step 5 sends the unique message ID along with the event message information generated in Step 3 to the outgoing message processing (OMP) function 36.

Continuing to refer to FIG. 7A, in Step 6 the OMP function 36 encodes the event message information (event state and unique message ID) and places this coded information into the body of an outgoing event notification message. As described earlier, any electronic messaging transmission protocol that automatically includes the body of an outgoing message in a response message is suitable for implementing an embodiment of this invention. In Step 7 the OMP transmits the message generated in Step 6 to one or more recipient devices, and in Step 8 the recipient device(s) receive the outgoing message and respond in some appropriate manner. This response can be a simple acknowledgement that the event notification message is received, the response can be an instruction to cancel the event or the response can be an instruction which escalates the event. Regardless, and according to one embodiment of the invention, the response message includes the original body of the event notification message to include the coded event message information (CEM). In Step 9, the input message processing (IMP) function 37 receives a response from each of the one or more recipient devices and parses the information included in the response message in order to identify both the recipients response (ACK, cancel, escalate) information and the coded event message information. The coded information is decoded and the information included in the response message received from the recipient device(s) is compared to the decoded information, and in Step 10 if at least some of the decoded information matches information included in the recipients response, then the response is validated and in Step 12 the response information and the unique message ID is sent to the Event Processing Module 34C. On the other hand, if in Step 10 the response message is not validated, then in Step 11 the response can simply be ignored. In Step 13, the module 34C can use the unique event message ID to correlate the validated response information with an event message identity to determine what, if any, further action to take with respect to the response.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. In an event notification system running on a network appliance, a method for validating a response to an event notification message, comprising:
    the event notification system generating the event notification message which correlates to an event received by the event notification system from an event generating device, the event notification message comprising one or more header fields and a message body;
    inserting coded event message information and uncoded event message information into the body of the event notification message and transmitting the event notification message to at least one recipient device;
    parsing information comprising the response received from the at least one recipient device to identify uncoded response information and the coded event message information;
    decoding the coded event message information and comparing it to the identified uncoded response information; and
    validating the response if at least some of the uncoded response information correlates to the decoded event message information.

2. The method of claim 1, further comprising the at least one recipient device receiving the event notification message and sending a response that includes the uncoded response information and the coded event message information.

3. The method of claim 2, further comprising a user operating the recipient device observing the received event notification message on a display associated with the recipient device, and entering information into the recipient device in response to the received event message.

4. The method of claim 3, wherein the received event notification message includes one or more response options.

5. The method of claim 4, wherein the response information entered into the recipient device by the user includes at least one of the response options included in the event notification message.

6. The method of claim 4, wherein the one or more response options comprise an acknowledgment of receipt of the message, an option to cancel the event message, and an option to escalate the event message.

7. The method of claim 1, wherein the coded event message information comprises event message state information and a unique message identity.

8. The method of claim 7, wherein the event message state information comprises one or more of an event identity, a recipient identity, message context, valid user responses, and a time stamp.

9. The method of claim 1, wherein the event notification message transmitted by the event notification system includes a recipient warning not to modify the coded portion of the message.

10. In an event notification network, a method for validating a response to an event notification message transmitted by an event notification system running on a network appliance, comprising:
    a event generating device connected to the event notification network generating and sending an event message to the event notification system;
    the event notification system receiving the event message from the event generating device and using information included in the event message to generate an event notification message, the event notification message comprising one or more header fields and a message body;
    inserting coded event message information and uncoded event message information into the body of the event notification message and transmitting the event notification message to at least one recipient device;
    parsing information comprising a response received from the at least one recipient device to identify uncoded response information and the coded event message information;
    decoding the coded event message information and comparing it to the identified uncoded response information; and
    validating the response if at least some of the uncoded response information correlates to the decoded event message information.

11. The method of claim 10, further comprising the at least one recipient device receiving the event notification message and sending a response that includes the uncoded response information and the coded event message information.

12. The method of claim 11, further comprising a user operating the recipient device observing the received event notification message on a display associated with the recipient device, and entering information into the recipient device in response to the received event message.

13. The method of claim 12, wherein the received event notification message includes one or more response options.

14. The method of claim 13, wherein the response information entered into the recipient device by the user includes at least one of the response options included in the event notification message.

15. The method of claim 13, wherein the one or more response options comprise an acknowledgment of receipt of the message, an option to cancel the event message, and an option to escalate the event message.

16. The method of claim 10, wherein the coded event message information comprises event message state information and a unique message identity.

17. The method of claim 16, wherein the event message state information comprises one or more of an event identity, a recipient identity, message context, valid user responses, and a time stamp.

18. The method of claim 10, wherein the event notification message transmitted by the event notification system includes a recipient warning not to modify the coded portion of the message.

19. An event notification system, comprising;
    a event generating device interface;
    an event notification module; and an output and an input message processor, wherein the event notification module receives an event message from the event generating device interface, generates an event notification message comprised of coded event message information in a message body field, the output message processor transmits the event notification message to a recipient device and receives a response from the recipient device comprised of uncoded recipient response information and the coded event message information, parses the information comprising the response to identify the uncoded recipient response information and the coded event message information, decodes the coded event message information and the event notification module compares the decoded information to the identified uncoded response information and validates the response if at least some of the uncoded recipient response information correlates to the decoded event message information.

20. The event notification system of claim 19, wherein the event notification module comprises a system configuration module, an event state store and an event processing and distribution function.

21. The event notification system of claim 19, wherein the coded event message information comprises event message state information and a unique message identity.

22. The event notification system of claim 21, wherein the event message state information comprises one or more of an event identity, a recipient identity, message context, valid user responses, and a time stamp.

* * * * *